United States Patent [19]

Singh

[11] Patent Number: 6,020,088

[45] Date of Patent: *Feb. 1, 2000

[54] GAMMA NIOOH NICKEL ELECTRODES

[75] Inventor: Deepika B. Singh, Gainesville, Fla.

[73] Assignee: Moltech Power Systems, Inc., Gainesville, Fla.

[21] Appl. No.: 08/972,851

[22] Filed: Nov. 18, 1997

[51] Int. Cl.[7] .................................................. H01M 4/32
[52] U.S. Cl. ................................................................ 429/223
[58] Field of Search .............................................. 429/223

[56] References Cited

U.S. PATENT DOCUMENTS

| | | | |
|---|---|---|---|
| 3,911,094 | 10/1975 | Megahed et al. | 423/592 |
| 4,612,213 | 9/1986 | Meunier | 427/126.6 |
| 5,348,822 | 9/1994 | Ovshinsky et al. | 429/223 |
| 5,567,549 | 10/1996 | Ovshinsky et al. | 429/223 |
| 5,569,562 | 10/1996 | Glemser et al. | 429/223 |
| 5,569,563 | 10/1996 | Ovshinsky et al. | 429/223 |

FOREIGN PATENT DOCUMENTS

| | | |
|---|---|---|
| 5-121071 | 5/1993 | Japan . |
| 5-144467 | 6/1993 | Japan . |
| 9496761 | 4/1994 | Japan . |

OTHER PUBLICATIONS

Corrigan, D.A. et al., Electrochemical and Spectroscopic Evidence on the Participation of Quadrivalent Nickel in the Nickel Hydroxide Redox Reaction, *J. Electrochem. Soc.* vol. 136, No. 3, Mar. 1989, pp. 613–619.

*Primary Examiner*—M. Nuzzolillo
*Assistant Examiner*—Jonathan Crepeau

[57] ABSTRACT

This invention relates to methods for producing nickel-based battery electrodes which comprise, when charged, stably cyclable gamma-nickel oxyhydroxide and to electrodes and electrode materials produced by these processes which do not require the addition of expensive stabilizing materials extraneous to the traditional electrode formation process.

76 Claims, 11 Drawing Sheets

GAMMA NIOOH NICKEL ELECTRODES

BACKGROUND OF THE INVENTION

Nickel-based electrodes are commonly used in rechargeable electrochemical cells. For example, nickel hydroxide particles, $Ni(OH)_2$, usually constitute the positive electrode in both nickel-cadmium and nickel-metal hydride cells. $Ni(OH)_2$ is the material of choice for positive electrodes in both types of cells because it can offer high energy density as well as good rate capability, desirable properties in today's battery market. High energy density is obtained through use of pasted electrodes in which a paste comprising high density spherical $Ni(OH)_2$ particles is applied to a foam substrate; high rate performance is typically obtained by using sintered $Ni(OH)_2$ electrodes.

The crystal structure of $Ni(OH)_2$ is characterized by a hexagonal unit cell with a layered structure comprising one nickel, two oxygen, and two hydrogen atoms per cell, as illustrated in FIG. 1. This "$\beta$-$Ni(OH)_2$" layered structure can also be described as a system of lamellar plates comprising an arrangement of nickel and oxygen atoms. When the typical $\beta$-$Ni(OH)_2$ electrode is charged, the positive electrode is oxidized and the Ni(II) of $\beta$-$Ni(OH)_2$ releases one electron to become Ni(III) and form beta nickel oxyhydroxide, $\beta$-NiOOH. In $\beta$-NiOOH, the lamellar plates of the crystal become slightly displaced away from each other, changing the volume of the unit cell. Upon discharge, the positive electrode is reduced, the Ni(III) of $\beta$-NiOOH accepting one electron to convert back to Ni(II) and form $\beta$-$Ni(OH)_2$, whereby the plates return to their initial positions.

Because it is desirable to increase cell capacity, a number of approaches have been tried to facilitate or enhance electron-transfer in the positive electrode. One such method, described in U.S. Pat. No. 5,569,562 to Glemser et al., involves the incorporation of Mn(II) into the positive material in order to facilitate complete discharge thereof by increasing the efficiency of the one-electron Ni(III)⇌Ni(III) conversion. U.S. Pat. No. 5,569,563 to Ovshinsky et al. similarly employs carbon in the positive material to facilitate electron transfer.

Another approach has been to increase the degree of electron exchange to above one electron per nickel atom by forming higher-oxidation state materials within the positive electrode. Such materials include $\gamma$-NiOOH, a material comprising both Ni(III) and Ni(IV), e.g., in the form of species including nickelate, $(NiO_2)_3^-$, in which the nickel atoms have fractional formal valences such as $3\frac{2}{3}$. Another such positive electrode material comprises regions of stable $\alpha$-$Ni(OH)_2$ which convert to $\gamma$-NiOOH upon charging. In contrast to the single-electron Ni(III)⇌Ni(II) conversion of $\beta$-NiOOH, the presence of $\gamma$-NiOOH within the charged electrode can increase the electron exchange to above 1 electron per nickel atom, through the participation of Ni(IV). Thus, in charged nickel electrodes containing $\gamma$-NiOOH, both Ni(III) and Ni(IV) are converted to Ni(II) upon discharge, thereby increasing the degree of electron exchange. For example, in this scenario, were the nickel content of the positive material to comprise half Ni(III) and half Ni(IV), complete discharge would theoretically increase the degree of electron exchange to an average of 1.5 electrons per nickel atom. If such an effect were stable, this would increase the electrical capacity of the electrochemical cell.

However, in $\gamma$-NiOOH, the lamellar plates of the crystal become significantly displaced away from each other, greatly expanding the crystal unit volume. FIG. 2 illustrates the differences in crystal structure among $\beta$-$Ni(OH)_2$, $\beta$-NiOOH, and $\gamma$-NiOOH. This expansion cracks the crystals into smaller particles and greatly increases the total internal surface area and the porosity of the positive electrode. The greater surface area results in the creation of dry areas in the separator. These dry areas are susceptible to oxidation which leads to the generation of gases within the cell. These effects cause cells to fail or radically shorten their life.

In response to these problems, manufacturers of rechargeable batteries regularly use $Ni(OH)_2$ which has been produced by co-precipitation with anti-$\gamma$ additives, such as cadmium and/or zinc metals or compounds. The additives interfere with $\gamma$-NiOOH formation, apparently by occupying the spaces between lamellar plates of the $\beta$ crystal structures and interacting with the plates to prevent their extensive displacement to the $\gamma$ structure. Without the anti-$\gamma$ additives, residual charge remaining in the positive after incomplete discharge would accumulate, ultimately converting the $\beta$-NiOOH to $\gamma$-NiOOH as depicted in FIG. 2.

The following series of reactions illustrates the charge-discharge cycle relationships between the various forms of $Ni(OH)_2$ and NiOOH.

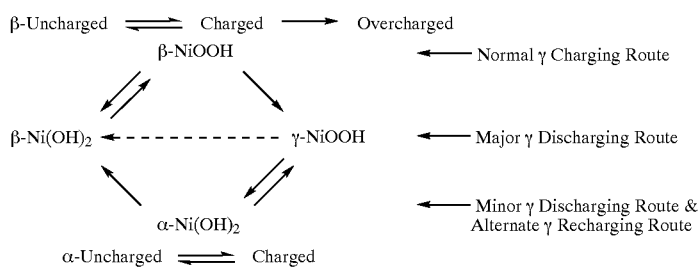

As shown, the most stable structure is the uncharged form, $\beta$-$Ni(OH)_2$. With normal charging, $\beta$-$Ni(OH)_2$, an Ni(II) form, converts to $\beta$-NiOOH, an Ni(III) form. In the traditional nickel electrode, this form is reduced back to $\beta$-$Ni(OH)_2$ upon discharge. If instead, $\beta$-NiOOH is further charged, i.e. "overcharged," it converts to $\gamma$-NiOOH, which contains Ni(IV). When $\gamma$-NiOOH is discharged, it mainly reverts directly to $\beta$-$Ni(OH)_2$, although a small percent may convert first to the unstable intermediate, $\alpha$-$Ni(OH)_2$.

The previously suggested methods of solving the above-noted problems with the use of $\gamma$-NiOOH, or $\alpha$-$Ni(OH)_2$, involve incorporating relatively high concentrations of various metals, metal hydrides, oxides, and alloys in $Ni(OH)_2$.

For example U.S. Pat. Nos. 5,384,822 and 5,567,549 to Ovshinsky et al. describe the incorporation of compositional modifiers to create stable regions of γ-NiOOH and/or α-Ni(OH)$_2$ within the positive. However, such methods require extra processing steps as well as the use of additional metals such as cesium and cobalt, increasing the cost needed both to make positives containing regions of these higher oxidation state phases, and to manufacture cells therefrom. Moreover, these stable-region methods fail to maximize the formation of γ-NiOOH and present an inherent limit on the possible improvement in cell electrical capacity.

SUMMARY OF THE INVENTION

Accordingly, it is an object of the present invention to produce nickel-based electrodes which comprise (upon charging) stably cyclable gamma-nickel oxyhydroxide. It is also an object of this invention to produce electrodes comprising: stably cyclable γ-NiOOH; β-NiOOH comprising stably cyclable γ-NiOOH; and/or β-Ni(OH)$_2$ of which at least a portion has been converted, at least once, to stably cyclable γ-NiOOH. An additional object of this invention is to produce cells comprising such electrodes.

Another object the present invention is to provide materials, among which are: stably cyclable γ-NiOOH; β-NiOOH comprising stably cyclable γ-NiOOH; and β-Ni(OH)$_2$ of which at least a portion has been converted, at least once, to stably cyclable γ-NiOOH. It is yet another object of the present invention to provide methods for producing these materials.

It is a further object of this invention to provide methods for forming electrodes which comprise, upon charging, stably cyclable gamma-nickel oxyhydroxide, which methods do not require the addition of stabilizing materials extraneous to the traditional electrode formation process. It is still another object of this invention to provide methods for forming such electrodes which do not require a significant increase in materials input or cost.

The use of defined sequences of charging and overcharging steps has been surprisingly found to achieve these objectives, by first converting nearly all β-Ni(OH)$_2$ to β-NiOOH and then converting β-NiOOH to γ-NiOOH, to achieve anywhere from about 5% to in excess of 95% stably cyclable γ-NiOOH formation. This results in the formation of stably cyclable γ-NiOOH without requiring (though allowing) the use of materials extraneous to traditional Ni(OH)$_2$ manufacture; this also permits formation of much higher concentrations of γ-NiOOH than those concentrations causing failure of cells containing traditional Ni(OH)$_2$— based positive electrodes. These methods may be practiced on free sintered or foam electrodes, not yet incorporated into cells, as well as on in-cell electrodes. These methods may also be practiced on free β-Ni(OH)$_2$ itself, i.e. β-Ni(OH)$_2$ not part of an electrode.

DETAILED DESCRIPTION OF THE PREFERRED EMBODIMENTS

Figure 1:
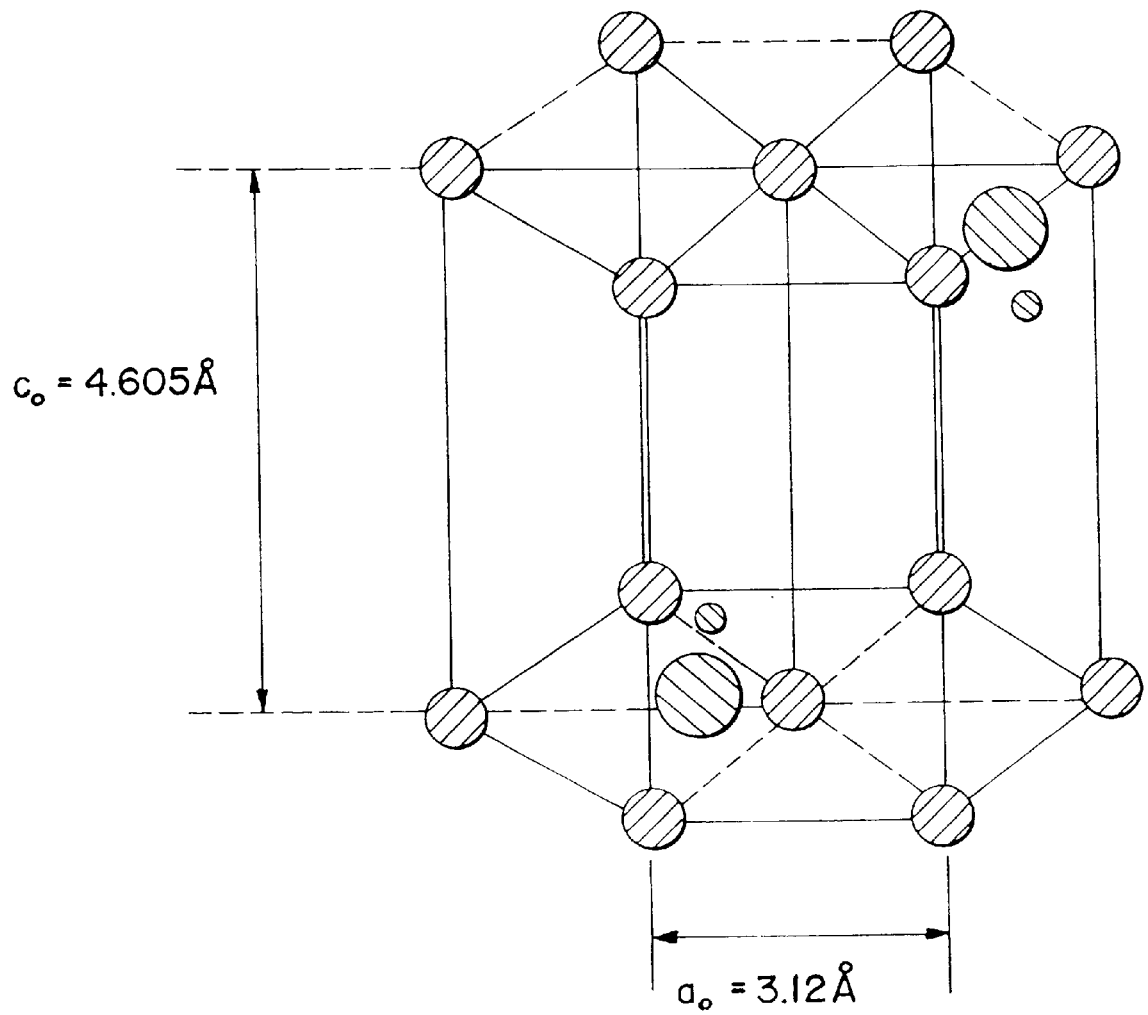
FIG. 1 illustrates the unit cell of a typical β-Ni(OH)$_2$ crystal, with its lamellar plate crystal structure.
Figure 1:
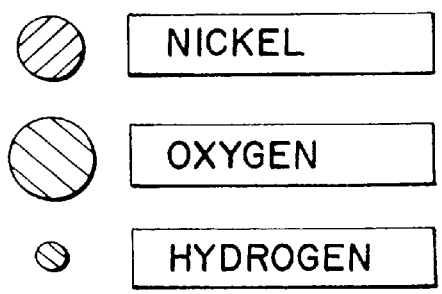
Figure 2:
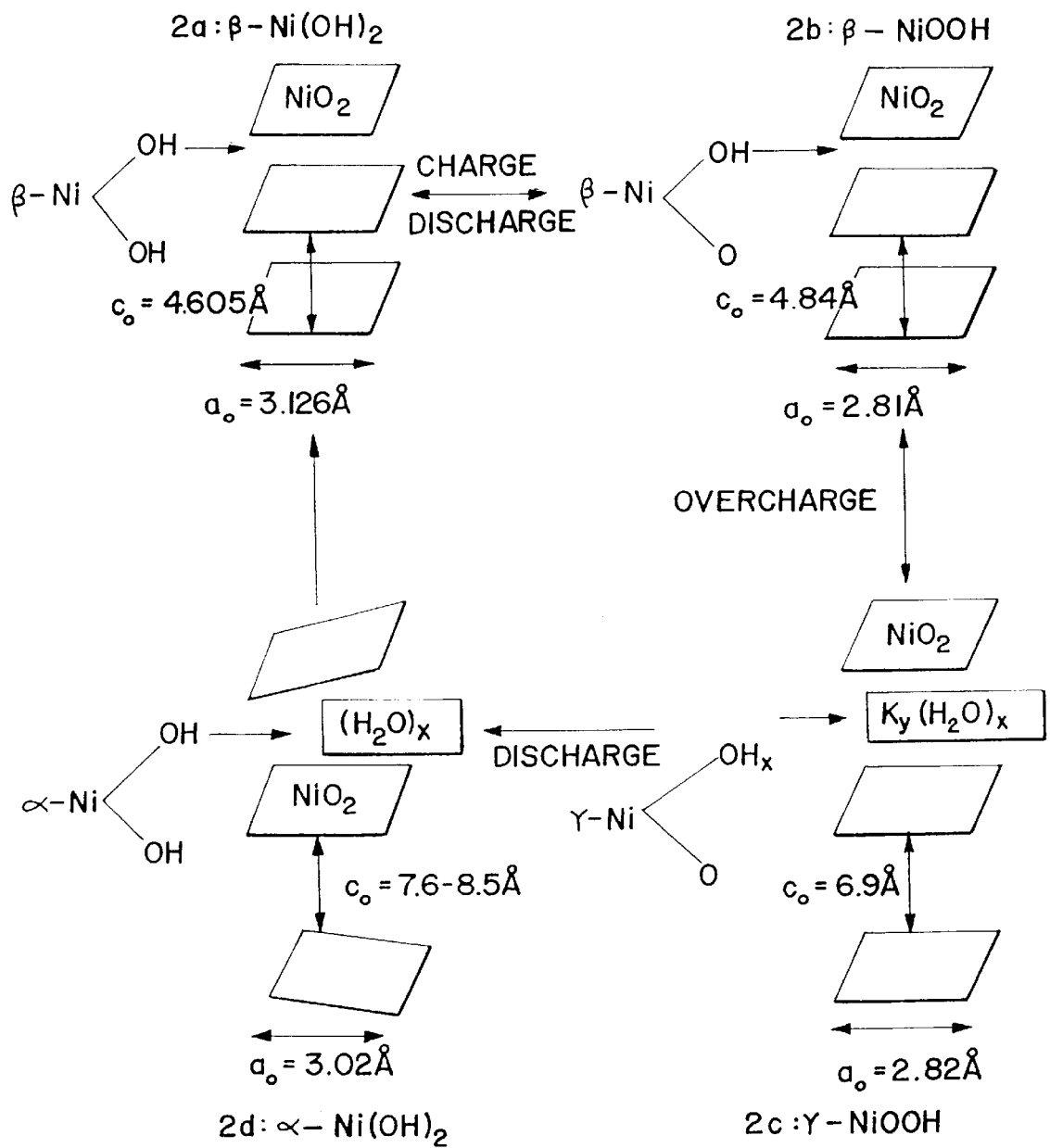
FIG. 2 is a Bode's Diagram illustrating the changes in crystal structure that occur as β-Ni(OH)$_2$ converts to β-NiOOH and as β-NiOOH converts to γ-NiOOH.

In a preferred embodiment, the nickel-based electrodes of the present invention comprise (upon charging) stably cyclable gamma-nickel oxyhydroxide. Preferred electrodes comprise: stably cyclable γ-NiOOH; and/or β-NiOOH comprising stably cyclable γ-NiOOH; and/or β-Ni(OH)$_2$ of which at least a portion has been converted, at least once, to stably cyclable γ-NiOOH. The preferred methods of the present invention employ defined sequences of charging steps to preferably convert at least about 5%, and more preferably up to about 100%, of β-Ni(OH)$_2$ to γ-NiOOH, where the γ-NiOOH is stably cyclable. These methods are practiced on either "free"—not yet incorporated into cells— or in-cell sintered nickel positive electrodes, or on the more flexible foam electrodes, whether free or in-cell, or on β-Ni(OH)$_2$ not yet part of an electrode.

In a preferred method for forming an electrode of the present invention, a Ni(OH)$_2$ electrode is overcharged, relative to its single-electron capacity, to effect conversion of Ni(OH)$_2$ to γ-NiOOH. This is preferably accomplished via one of two routes.

In a first preferred method, the conversion of Ni(OH)$_2$ to γ-NiOOH is effected by a preferably identically repeated overcharge-discharge step. The electrode is preferably overcharged both to a potential of at least about 0.5 volts relative to a Hg/HgO reference electrode ("Hg/HgO")—more preferably at least about 0.55 V relative to Hg/HgO—and to at least about 125% of the electrode's single-electron capacity—more preferably at least about 150%, even more preferably at least about 200%, and yet more preferably at least about 300%—and held in this highly charged state for a period of time. Preferably the electrode is held at this potential for at least about 15 minutes, more preferably at least about 30 minutes, and still more preferably at least about 60 minutes. The electrode is then allowed to discharge to a potential of about 0 volts relative to Hg/HgO and the charging step is repeated.

This charge-discharge series is applied for a total of at least three cycles, more preferably at least 7 cycles, still more preferably at least 11 cycles. In this process, e.g., 20, 50, 100, and even hundreds of cycles may be employed, the only limitation being that of the available time. As a result of these at least three charge-discharge cycles, preferably at least about 5 mole % of the Ni(OH)$_2$ is converted to γ-NiOOH, more preferably at least about 7%, still more preferably at least about 10%, again more preferably at least about 25%, even more preferably at least about 50%, yet still more preferably at least about 75%, yet again more preferably at least about 90%, even further preferably at least about 95%, and most preferably about 100%. Any β-Ni(OH)$_2$ electrode may be used in this process. Preferred electrodes include foam electrodes and sintered electrodes, either free or in-cell. In a particularly preferred embodiment, this method is practiced on a free sintered Ni(OH)$_2$ electrode and the overcharge potential is maintained for at least about 60 minutes in at least eleven charge-discharge cycles.

Sintered nickel electrodes may be produced by such methods as are known in the art. A preferred method of preparing a sintered nickel electrode comprises providing a conductive metal sintered plaque substrate, putting the substrate through at least one impregnation-cleaning series— i.e. impregnating the substrate with Ni(OH)$_2$ by means of a loading-conversion cycle and then electrochemically cleaning the impregnated substrate. Preferably, at least about two cycles of impregnation are employed, more preferably a total of about three to about ten cycles, and yet more preferably about five to about seven cycles. In an especially preferred embodiment, the substrate undergoes three cycles of impregnation, one cycle of electrochemical cleaning, then another three cycles of impregnation, followed by another cycle of electrochemical cleaning. Each impregnation cycle comprises at least two steps.

In a first step, the substrate is loaded by dipping in an acidic solution—i.e. solution or suspension—comprising a nickel salt, preferably Ni(NO$_3$)$_2$; this solution may also comprise one or more other metal compounds, such as cadmium compounds, cobalt compounds, copper compounds, bismuth compounds, indium compounds, magnesium compounds, manganese compounds, vanadium compounds, yttrium compounds, zinc compounds, or other nickel compounds, e.g., metal nitrates such as Cd(NO$_3$)$_2$ and/or Co(NO$_3$)$_2$. The acidic nature of the solution is due to the presence of an acid. Any acid may be employed, though sulfuric, acetic, and/or nitric acid are preferred. More preferred is nitric acid. In a second step, performed after the loading step, the substrate-born Ni(NO$_3$)$_2$ is converted to Ni(OH)$_2$ by dipping in a solution comprising at least one caustic base, most preferably NaOH, though, e.g., KOH and/or LiOH, or mixtures thereof with NaOH are also preferred alternatives. These two steps are not exclusive of others, as one or more of the impregnation cycles may also comprise further steps wherein, e.g., other metal(s) or metal compound(s) are incorporated into or upon the surface of the Ni(OH)$_2$.

After at least one impregnation cycle has been completed, the Ni(OH)$_2$-impregnated substrate is electrochemically cleaned in a solution comprising at least one caustic base, most preferably, NaOH, though, e.g., KOH and/or LiOH, or mixtures thereof with NaOH are also preferred alternatives. While the impregnated plaque is immersed in this solution, a charge is applied thereto—typically about 60% of capacity, as based on a single-electron exchange, given the mass of Ni(OH)$_2$ thereon, i.e. 60% of "single electron capacity," although other charge levels, including zero charge, may be used instead. After cleaning, the impregnated substrate may be incorporated into a cell as its positive electrode, according to any procedures such as are known in the art.

In a second preferred method, the conversion of Ni(OH)$_2$ to γ-NiOOH takes place in two stages. In the first stage, substantially all the Ni(OH)$_2$ is converted to β-NiOOH; in the second stage, β-NiOOH is converted to γ-NiOOH. In this method, a Ni(OH)$_2$ electrode is charged to full, theoretical single-electron capacity at a moderate rate of charge of about C to about C/5. Then, the electrode is overcharged preferably to at least about 125% of full, theoretical single-electron capacity at a slower rate of charge of about C/5 to about C/10, more preferably to at least about 150% of single electron capacity, yet more preferably at least about 200%, and still more preferably at least about 300%. These two steps may be preceded by a precharging step comprising charging the electrode at a preferable rate of about 1/20 to about 1/100 of C—more preferably about 1/50 of C—for an extended time period of at least about 2 hours, more preferably at least about 5 hours. Most preferably, when used, the precharging step is applied long enough to charge the electrode to single electron capacity. Use of a precharging step is especially preferred when the electrode contains a charge transfer-enhancing additive, such a cobalt-based additive.

Although in one preferred embodiment, the above steps may be applied only once to the electrode, the charging and overcharging steps—or the precharging, charging, and overcharging steps—may also be, and preferably are, repeated in order as a cycle. When these steps are cycled, preferably a total of at least two cycles, more preferably at least 10 cycles, still more preferably at least 20 cycles are performed. In this cyclic process, e.g., 50, 100, or even many more cycles may be employed. As a result of this process, preferably at least about 5 mole % of the Ni(OH)$_2$ is converted to γ-NiOOH, more preferably at least about 10%, still more preferably at least about 25%, again more preferably at least about 50%, even more preferably at least about 75%, yet still more preferably at least about 90%, yet again more preferably at least about 95%, and most preferably about 100%.

Any β-Ni(OH)$_2$ electrode may be used in this process. Preferred electrodes include foam electrodes and sintered electrodes, either free or in-cell. In an especially preferred embodiment, this method is practiced on a foam electrode, either free or in-cell, and the overcharging step comprises charging the electrode to at least about 200%, and more preferably at least about 300% of full, theoretical single-electron capacity. Again, as a result of these two charging steps, at least about 5 mole %, more preferably at least about 7%, and as for the process described above, even more preferably up to about 100% of the Ni(OH)$_2$ is converted to γ-NiOOH.

Foam electrodes may be produced by methods such as are known in the art. A preferred method of making a foam electrode comprises pasting a slurry of Ni(OH)$_2$ particles onto the surface of, and into the pores of, a conductive metal substrate having a foam-type structure or a sponge-like structure and the paste is then dried. Preferably, the Ni(OH)$_2$ particles are approximately spherical in shape, i.e. their outer surfaces approximate spheres, spheriods or ellipsoids. Such Ni(OH)$_2$ particles may be purchased from various metals manufacturers including Inco. Ltd. (Toronto, Ont., CAN), Tanaka Chem. Corp. (Osaka, JAP), H. C. Starck (Goslar, Del.), and Nichimen Corp. (Tokyo, JAP).

The Ni(OH)$_2$ particles may also contain additives such as other metals and/or metal compounds such as cadmium, cobalt, copper, bismuth, indium, magnesium, manganese, vanadium, yttrium, or zinc metal(s) or compound(s), or nickel metal or other nickel compound(s), or mixtures of any of the aforementioned. Especially preferred additives include zinc, cadmium, and/or manganese metal(s) or compound(s). These and the other additives are preferably added as co-precipitates during formation of the Ni(OH)$_2$ particles, though other methods such as are known in the art may be used, alternatively or additionally, to treat the $Ni(OH)_2$ particles after their formation so as to combine the additives with the particles, e.g., to produce absorption of the additive(s) into the particles, adsorption or coating of the additive(s) onto the particles, and so forth. Also preferred from among these is at least one cobalt-based additive selected from the group consisting of CoO, $Co(OH)_2$, $Co(OH)_3$, CoOOH, $CoO_2$, $(CoO_2)^-$, $(CoO_2)_2^-$, $(CoO_2)_3^-$, elemental cobalt, and cobalt alloys especially preferred is CoO. Preferably the cobalt-based additive originates as at least one cobalt source added to the $Ni(OH)_2$ which is selected from the group consisting of elemental cobalt, cobalt alloys, cobalt salts, and other cobalt compounds. Preferably, the cobalt-based additive originates as a coprecipitant with $Ni(OH)_2$.

The $Ni(OH)_2$ particles are used to form a slurry comprising these particles along with a solvent, a viscosity increasing agent (such as a binder), and a conductor. A preferred slurry comprises the approximately spherical $Ni(OH)_2$ particles in an aqueous mixture comprising water as the solvent, a hydrophilic binder, and a conductor. The hydrophilic binder will preferably comprise any hydrophilic polymer(s), preferred examples of which include methyl cellulose, hydroxymethyl cellulose, carboxymethyl cellulose, and mixtures thereof. The conductor is preferably one of the metals and/or metal compounds (or mixtures thereof) mentioned above as useful additives to the $Ni(OH)_2$ particles. A preferred conductor is CoO. After the pasted substrate is dried, it may be incorporated into a cell as its positive electrode, according to any procedures such as are known in the art, as, e.g., by: providing a cell housing, an electrolyte, a separator, and a negative electrode; inserting the positive and negative electrodes into the cell housing along with the electrolyte and separator, ensuring that the separator separates the positive from the negative electrode; and then sealing the cell housing.

EXAMPLE 1

Two groups of sintered $Ni(OH)_2$ positive electrodes were produced, as described above, by putting sintered nickel substrates through six impregnation cycles, then one electrochemical cleaning with a charge of about 60% of single electron capacity. Group 1 electrodes were cycled 11 times using a charge-discharge regimen consisting of charging at a voltage scan rate of 0.05 mV/s up to both a constant, non-pulsed potential of 0.5 volts (relative to Hg/HgO, i.e. an Hg/HgO reference electrode) and a total charge of about 200% of single electron capacity. This potential/charge state was maintained for 60 minutes and then the electrodes were discharged to about 0 volts. Group 2 electrodes were put through the same regimen, but for the use of a constant charging voltage of 0.6 V. Group 1 and 2 electrodes were analyzed, in the fully charged state, by X-ray diffraction to verify the presence of β and/or γ crystal forms. Finally, charged Group 1 and Group 2 electrodes were discharged at a current of 20 mA and their discharge curves were recorded.

Figure 3:
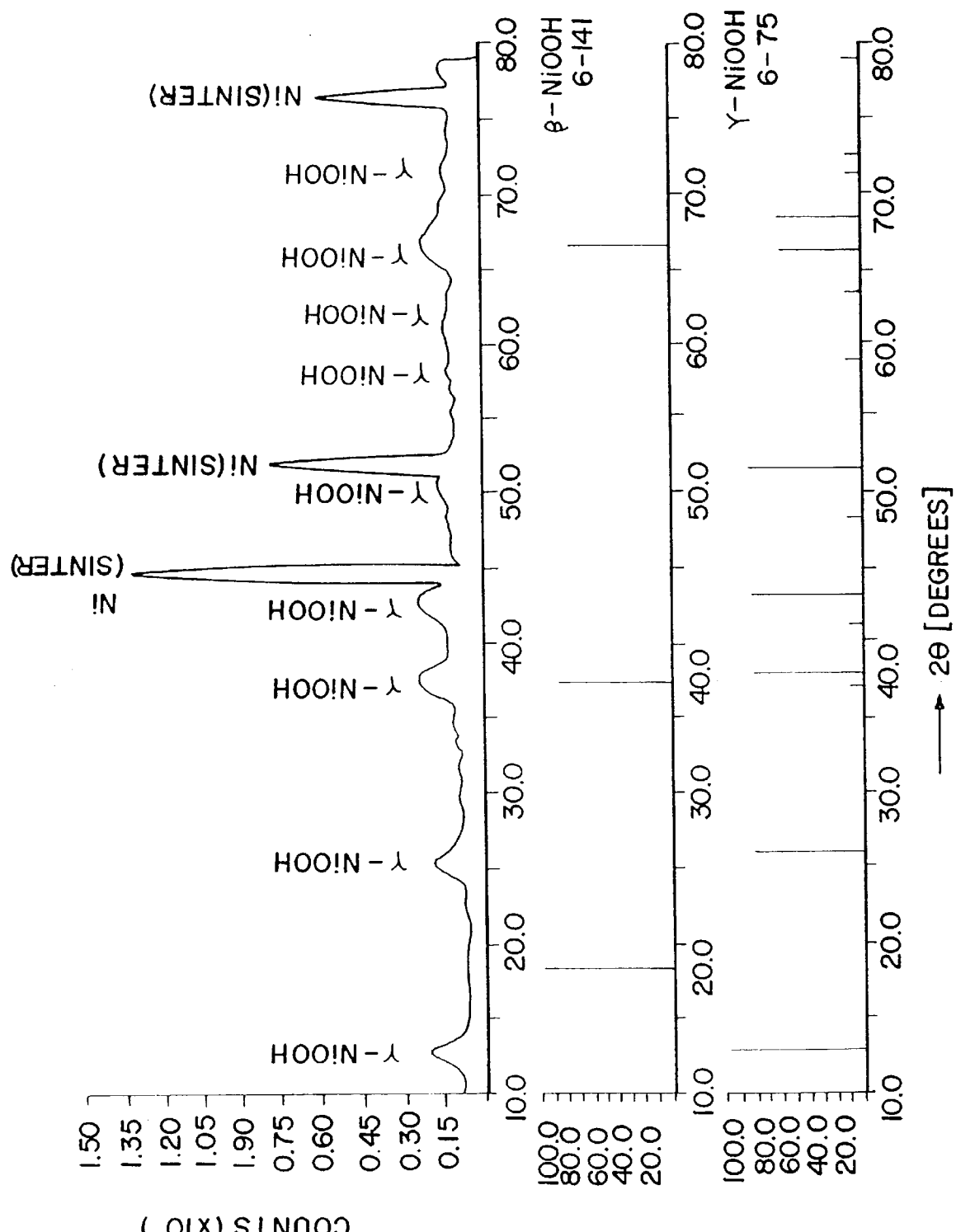
FIG. 3 presents an X-ray diffraction analysis of the γ-NiOOH electrode of the present invention.

The results are presented in FIGS. 3–8. The X-ray diffraction analysis presented in FIG. 3 shows that the non-substrate nickel content of the sintered NiOOH electrode of the present invention comprises nearly 100% γ-NiOOH.

Figure 4:
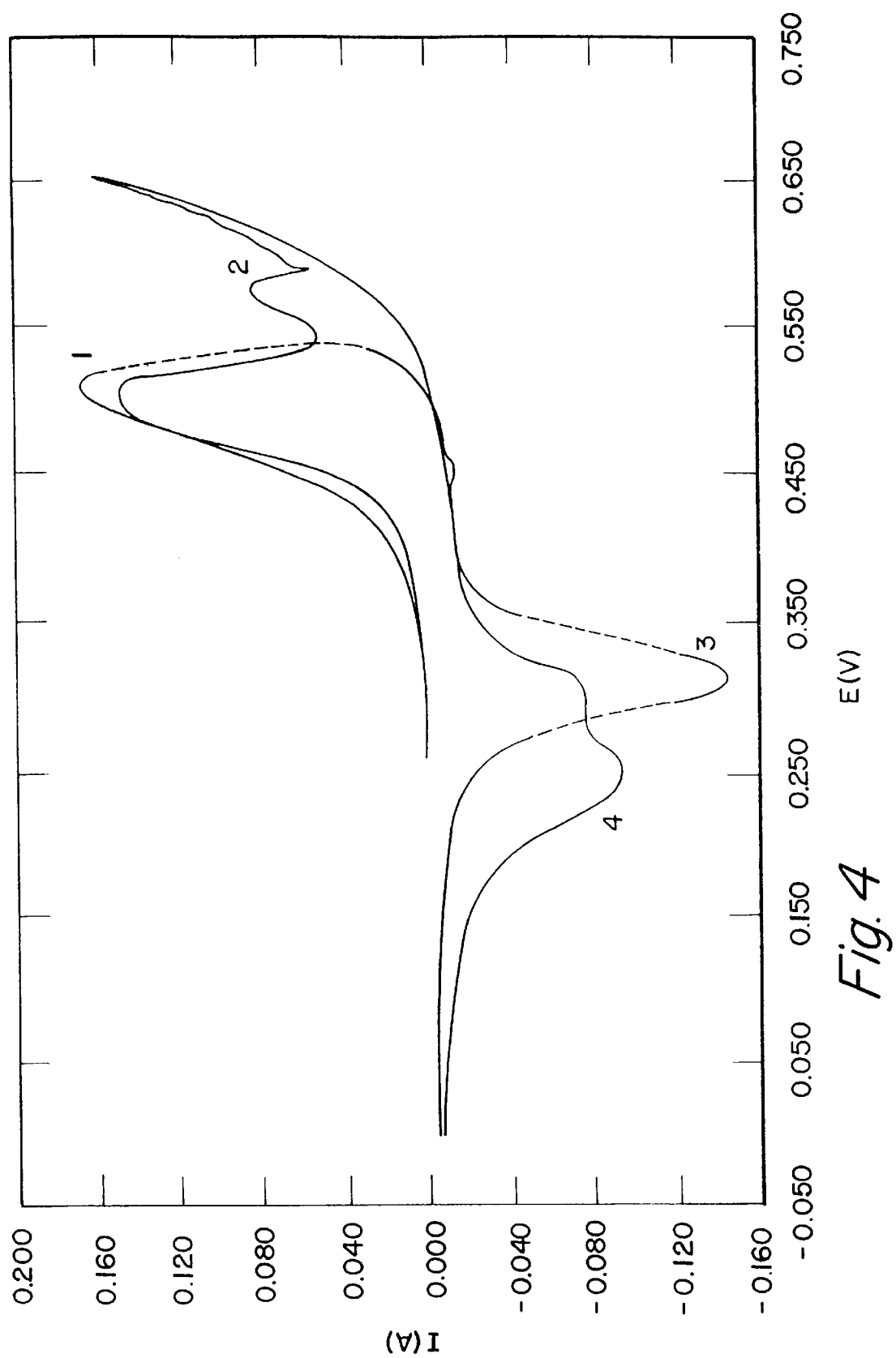
FIG. 4 presents a tracing for the charging and discharging processes involved in the traditional β-NiOOH electrode and the γ-NiOOH electrode of the present invention.
Figure 5:
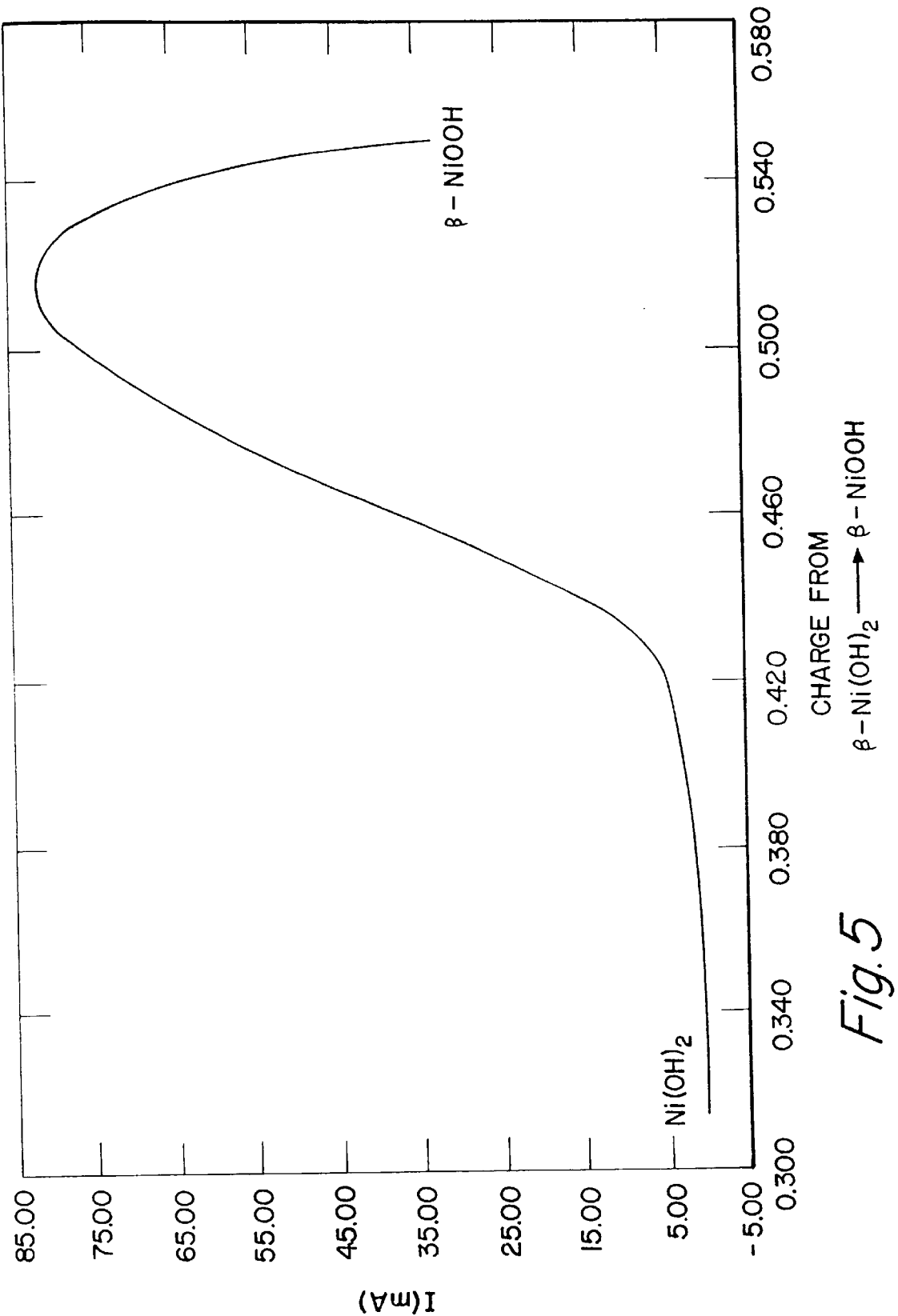
FIG. 5 presents a tracing for the traditional β-NiOOH electrode charging process.

In FIG. 4, there are two tracings, one representing the charging and discharging taking place in Group 1 electrodes and one representing that taking place in the Group 2 electrodes. (The curves shown in FIGS. 4–8 were generated in a single electrode which was charged to β-NiOOH and discharged to $Ni(OH)_2$ and then overcharged to γ-NiOOH and discharged to $Ni(OH)_2$; these curves are representative of those obtained for Group 1 and 2 electrodes). The first tracing comprises peaks 1 and 3, connected by a dashed tracing. FIG. 5 presents a close-up view of peak 1. Peak 1 marks the voltage at which $Ni(OH)_2$ converts to β-NiOOH and peak 3 marks the discharge transition from β-NiOOH to $Ni(OH)_2$. The second tracing comprises the entirely solid tracing constituting peaks 2 and 4. Peak 2 indicates the voltage at which γ-NiOOH forms from β-NiOOH, and peak 4 shows that for the reverse or discharging reaction. FIG. 7 presents a close-up view of peak 2. These tracings demonstrate that γ-NiOOH begins forming at slightly above 0.55 volts in contrast to β-NiOOH which completes formation at or slightly below 0.55 volts; also, γ-NiOOH reaches a maximum discharge rate at or slightly above 0.25 volts, a voltage somewhat lower than that for β-NiOOH.

Figure 6:
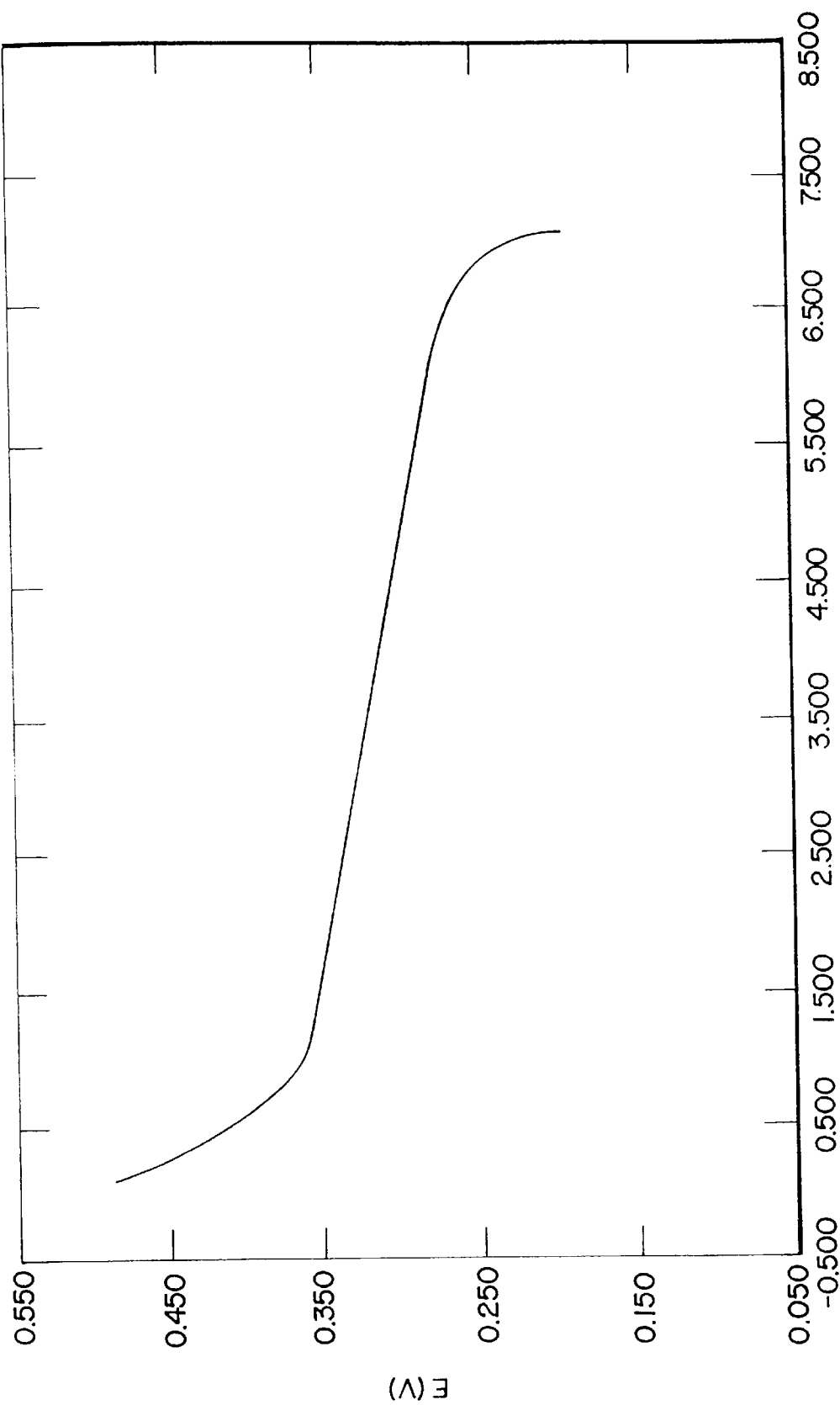
FIG. 6 presents a discharge curve for the charged, traditional β-NiOOH electrode.
Figure 7:
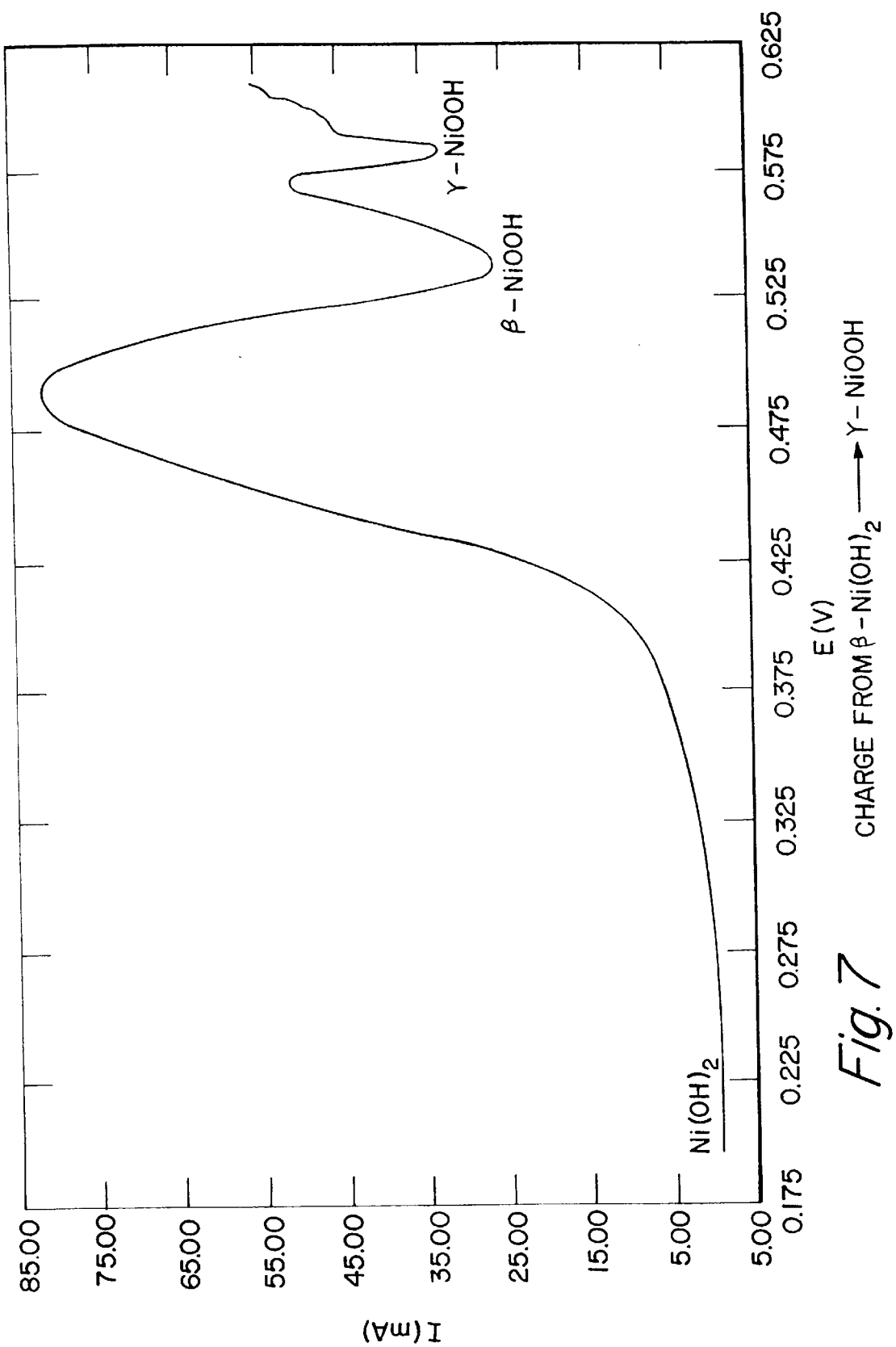
FIG. 7 presents a tracing for the γ-NiOOH electrode charging process.
Figure 8:
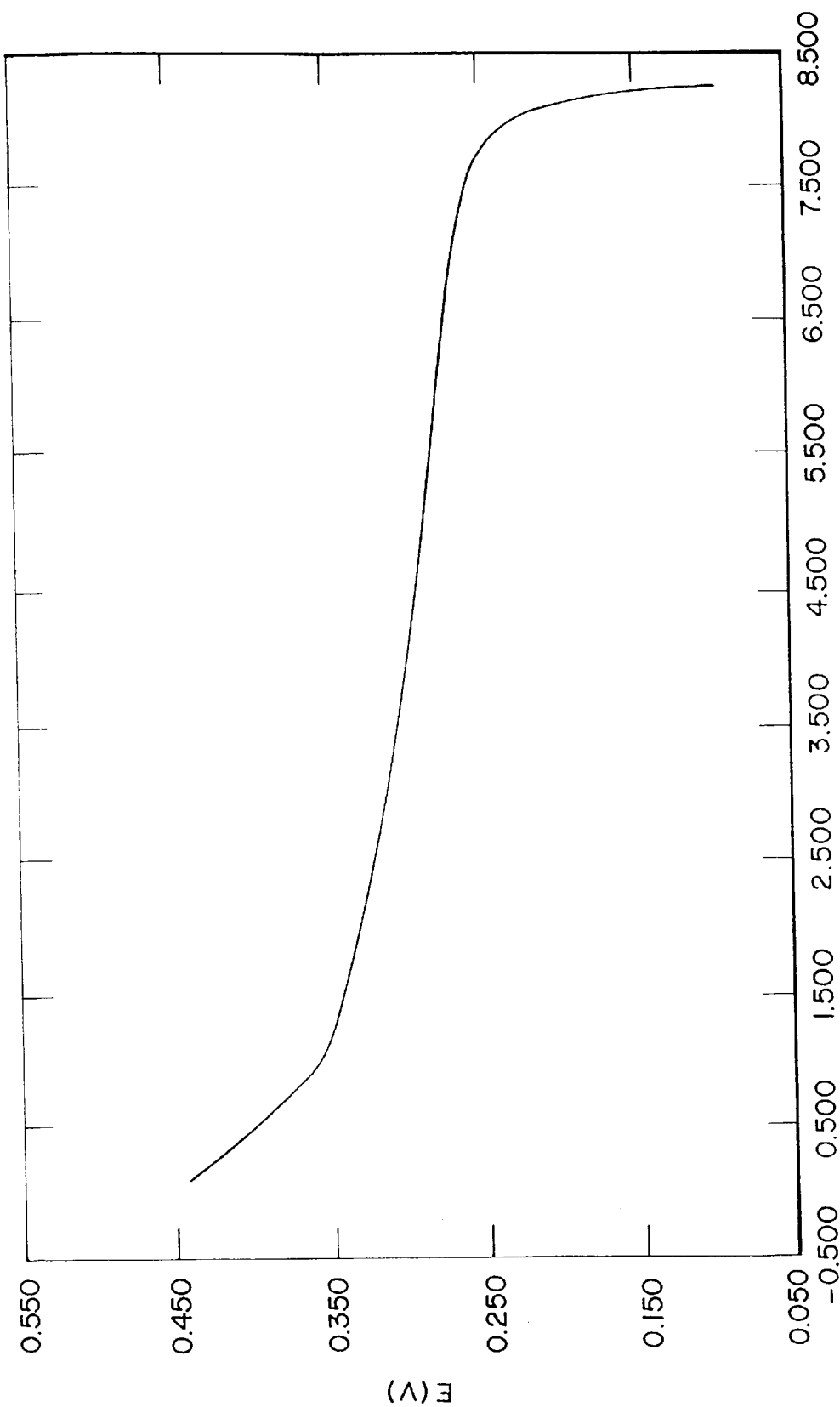
FIG. 8 presents a discharge curve for the charged γ-NiOOH electrode.

These discharge voltages are further confirmed by the discharge curves shown in FIG. 6, for β-NiOOH, and FIG. 8, for γ-NiOOH. These two figures also serve as a measure of cell capacity: at the constant 20 mA discharge current, the β-NiOOH electrode took about 1.9 hours to fully discharge, while the γ-NiOOH electrode took about 2.3 hours. The electrode as prepared according to the methods of the present invention had a 46 mAh capacity, a more than 20% increase in capacity over the 38 mAh β-NiOOH electrode, yet using the same amount of material from the same source.

EXAMPLE 2

Three groups of 4/3A-size cells were prepared using foam $Ni(OH)_2$ positive electrodes produced, as described above, by pasting a slurry of spherical $Ni(OH)_2$ particles—which were obtained as a coprecipitate containing zinc and cobalt—onto a nickel foam substrate. These cells had single-electron capacity ratings of 2800 milliamp-hours (mAh). Group 1 cells were put through a single charge regimen consisting of charging at a rate of 1/50 of C for 5 hours, then charging at a rate of C/5 for a period of 6 hours, and finally charging at a rate of C/10 until a 150% overcharge was achieved. Group 2 and Group 3 cells were put through the same regimen except that, in the final, C/10 charging step, they were overcharged to 200% and 300%, respectively. Cells were then discharged at a constant current of 2800 mA and their discharge capacities were calculated.

Figure 9:
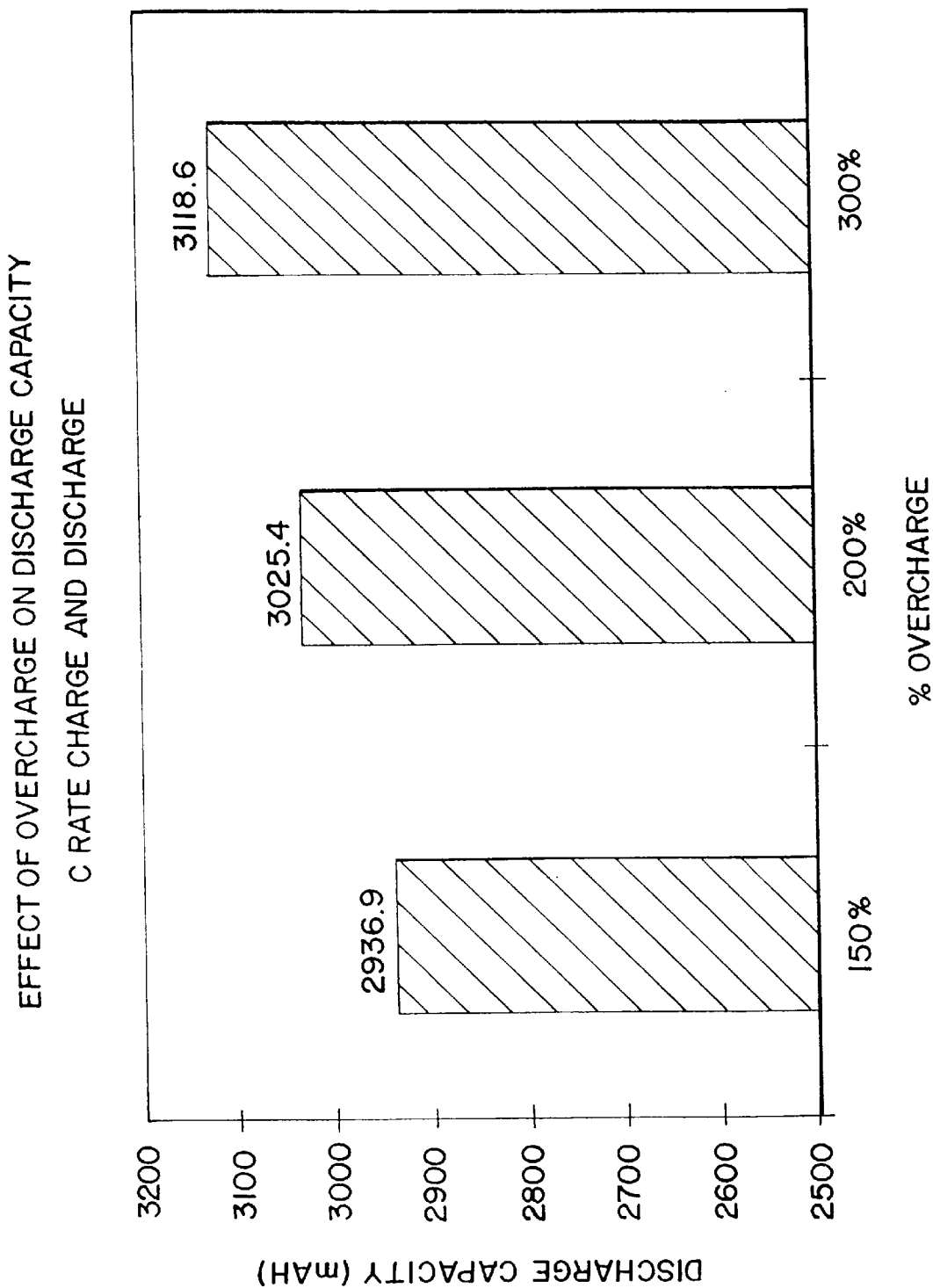
FIG. 9 presents a bar chart of the discharge capacities of various overcharged versions of the stably cyclable γ-NiOOH foam electrodes of the present invention.
Figure 10:
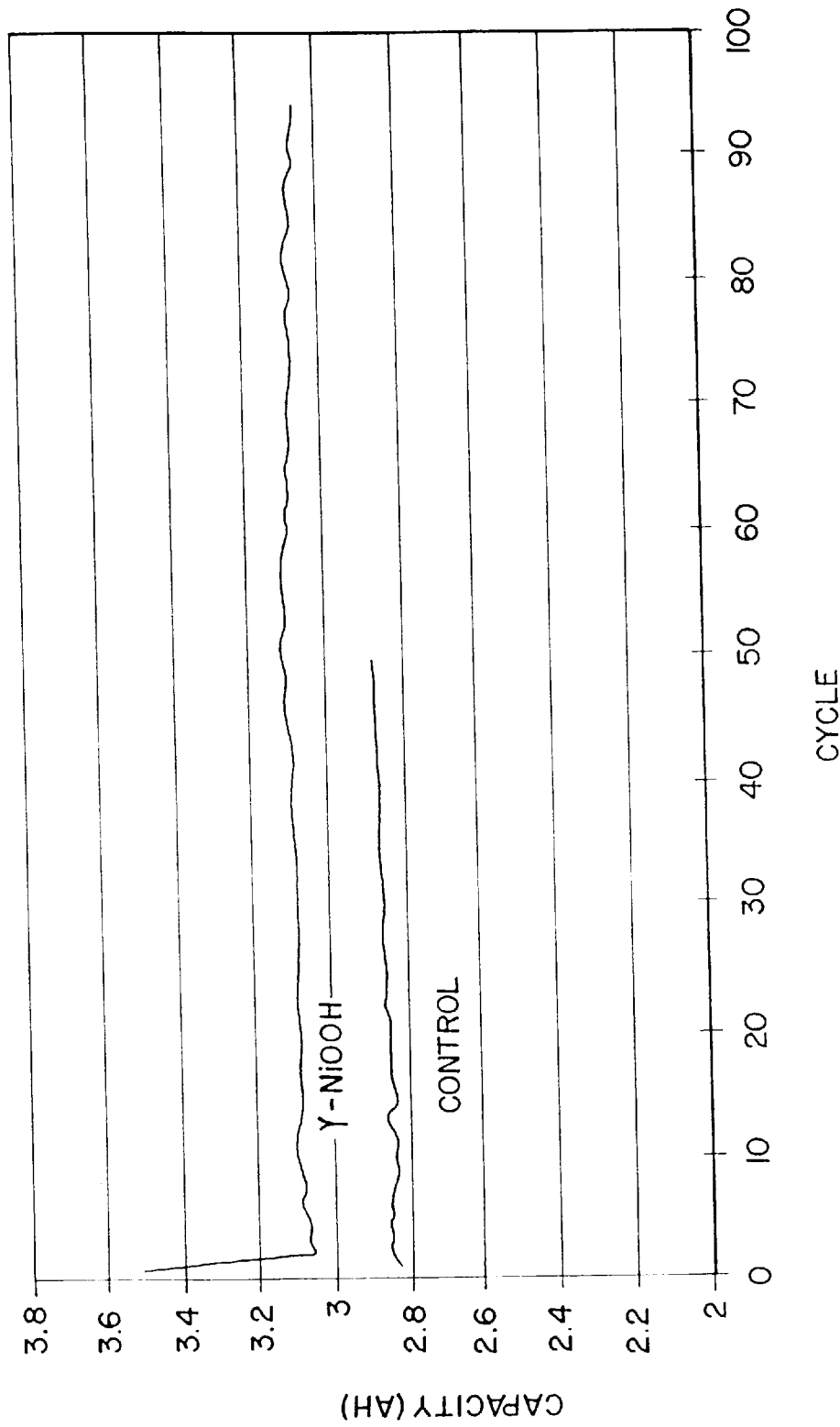
FIG. 10 presents a comparison of the capacities of the traditional β-NiOOH electrode and the 300% overcharged foam γ-NiOOH electrode of the present invention, where both samples were discharged at C rate.
Figure 11:
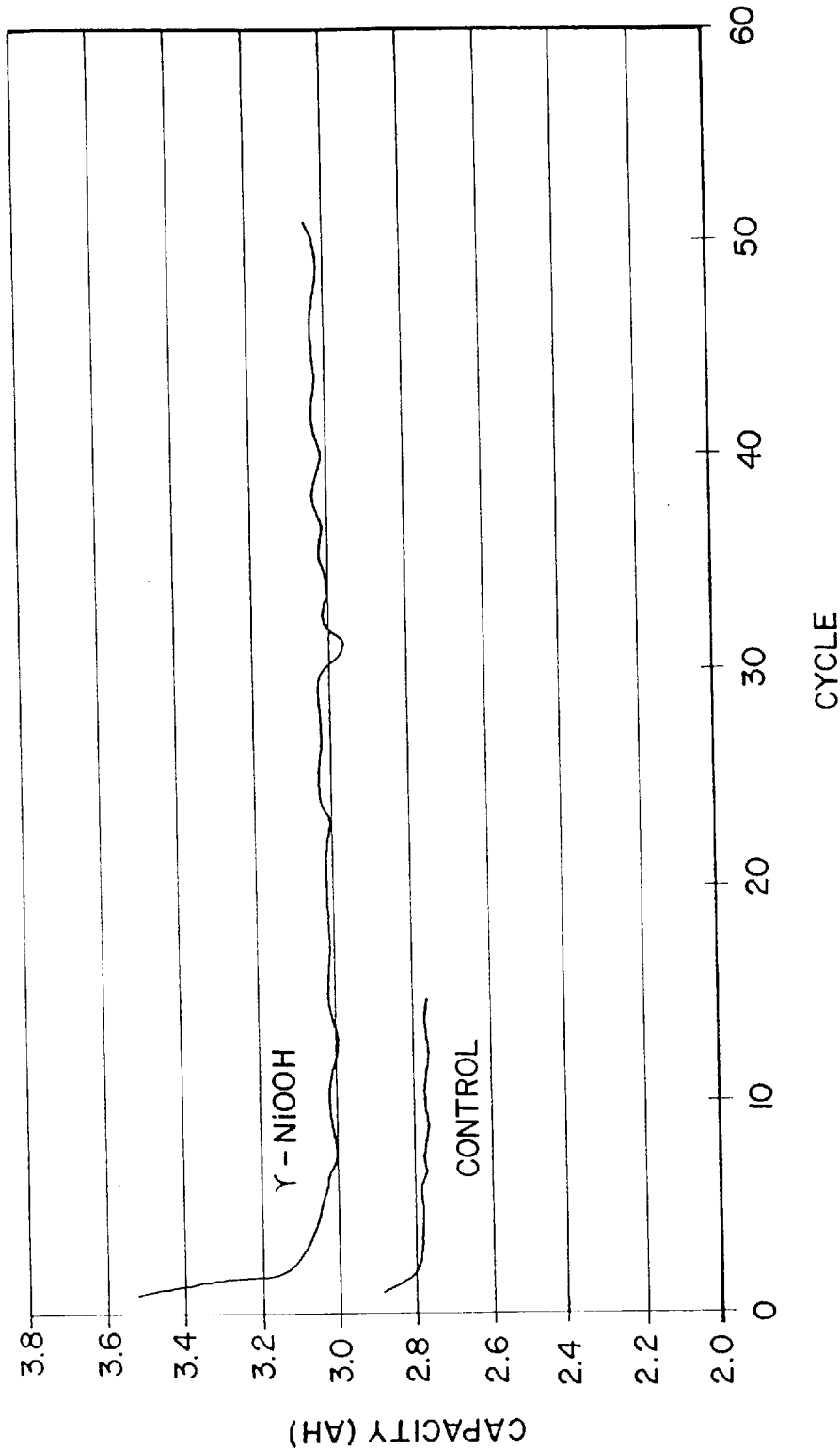
FIG. 11 presents a comparison of the capacities of the traditional β-NiOOH electrode and the 300% overcharged foam γ-NiOOH electrode of the present invention, where both samples were discharged at a rate of ½ of C.

Results are presented in FIG. 9. As shown, the 150% (Group 1) overcharged electrodes had a capacity of over 2900 mAh, those overcharged to 200% (Group 2) had above a 3000 mAh capacity, and those overcharged to 300% (Group 3) had a 3,100 mAh capacity. The Group 3 γ-NiOOH electrodes were further compared with β-NiOOH control electrodes in two tests of discharge capacity over time. In the first test, electrodes were charged and discharged at C rate; in the second test, at ½ of C rate. Results are presented in FIGS. 10 and 11. In both tests, the γ-NiOOH electrodes of the present invention outperformed the β-NiOOH controls. As shown in the figures, the Group 3 electrodes retained a capacity of 3100 mAh for over 90 charge-discharge cycles at C rate, a 250 mAh improvement over the β-NiOOH electrode. Likewise, at ½ of C rate, the γ-NiOOH electrodes achieved an approximate 200 mAh improvement over β-NiOOH.

It is believed that electrodes formed by the preferred methods contain stably cyclable γ-NiOOH as a result of treatment with such charging regimens. This finding is quite surprising in light of the prevalent understanding in the art that γ-NiOOH formation is undesirable, even in the presence of excess electrolyte, since it was thought that accumulation of γ-NiOOH resulting from repeated overcharging-discharging would cause speedy disintegration of the electrode material, regardless of the environment surrounding the electrode. This prevalent understanding explains the prior art attempts to stabilize γ-NiOOH regions using materials extraneous to the traditional electrode formation process. See, e.g., U.S. Pat. Nos. 5,384,822 and 5,567,549 to Ovshinsky et al.

In contrast, electrodes containing γ-NiOOH formed according to the methods of the preferred embodiments contain γ-NiOOH which is stably cyclable in that these electrodes may be repeatedly charged and discharged while utilizing the higher capacity of the γ-NiOOH, even without the use of such extraneous materials. The phrase "stably cyclable" indicates that γ-NiOOH is reliably formed, in each charging cycle for at least about 150 cycles, whether such γ-NiOOH in a given electrode represents a relatively unchanging fraction (on average) of the available nickel species or a fraction thereof that increases with each charging cycle; if it represents a growing fraction, then the size of this fraction ultimately stabilizes in an average amount not exceeding 100 mole % of the available nickel species.

Therefore, within the scope of the present invention are materials, among which are: stably cyclable γ-NiOOH; β-NiOOH comprising stably cyclable γ-NiOOH; and β-Ni(OH)$_2$ comprising β-Ni(OH)$_2$ which has been converted, at least once, to stably cyclable γ-NiOOH. Preferably, the β-Ni(OH)$_2$ material is suitable for use in an electrode of an electrochemical cell. More preferably the β-Ni(OH)$_2$ material comprises β-Ni(OH)$_2$ of which at least about 5% has been converted, at least once, to stably cyclable γ-γ-NiOOH, even more preferably at least about 10%, still more preferably at least about 15%, yet more preferably at least about 20%, more preferably still at least about 25%, further preferably at least about 50%, even further preferably at least about 75%, yet further preferably at least about 90%, still further preferably at least about 95%, even further preferably still at least about 98%, and most preferably about 100% of which has been converted, at least once, to stably cyclable γ-NiOOH. Also within the scope of the present invention are electrodes comprising one or more of these materials and cells comprising such electrodes.

Variations of the methods and resulting electrodes and cells described herein as the preferred embodiment may be apparent to those skilled in the art once they have studied the above description. Variations such as these are considered to be within the scope of the invention, which is intended to be limited only to the scope of the claims and the reasonably equivalent materials and methods to those defined therein. The foregoing examples illustrate a preferred embodiment of the invention. Various changes can be made without departing from the invention as defined in the appended claims, which are to be interpreted in accordance with the principle of patent law including the Doctrine of Equivalents.

The embodiments of the invention in which an exclusive property or privilege is claimed are defined as follows:

1. A method of producing a positive electrode which will contain, upon charging, stably cyclable γ-NiOOH, comprising the steps of:
   providing a Ni(OH)$_2$ electrode,
   charging said electrode both to a potential of at least about 0.5 V, relative to Hg/HgO, and to a charge input level of at least about 125% of single electron capacity, and maintaining said electrode at said potential and charge input level for at least about 15 minutes,
   discharging said electrode to a potential of about 0 V, relative to Hg/HgO, and
   repeating said charging and discharging steps as a cycle in order at least two more times for a total of at least three complete cycles.

2. The method according to claim 1 wherein said charging step comprises charging said positive electrode both to an overcharge potential of at least about 0.55 V, relative to Hg/HgO, and to a charge input level of at least about 150% of single electron capacity, and maintaining said positive electrode at said potential and charge input level for at least about 60 minutes.

3. The method according to claim 1 wherein said charge input level is at least about 200% of single electron capacity.

4. The method according to claim 3 wherein said charge input level is at least about 300% of single electron capacity.

5. The method according to claim 1 wherein said step of providing a Ni(OH)$_2$ electrode comprises providing a sintered Ni(OH)$_2$ electrode.

6. The method according to claim 5 wherein said sintered Ni(OH)$_2$ electrode is already incorporated into an electrochemical cell.

7. The method according to claim 5 wherein said electrode has not yet been incorporated into an electrochemical cell and wherein said method further comprises a step of incorporating the electrode into an electrochemical cell after the step of repeating said charging and discharging steps.

8. The method according to claim 7 wherein said step of incorporating the electrode into an electrochemical cell comprises the substeps of:
   providing a cell housing, an electrolyte, a separator, and a negative electrode;
   inserting said positive electrode into the cell housing along with the electrolyte and along with, and separated by the separator from, said negative electrode; and
   sealing the cell housing.

9. The method according to claim 1 wherein said step of providing a Ni(OH)$_2$ electrode comprises providing a foam Ni(OH)$_2$ electrode.

10. The method according to claim 9 wherein said foam Ni(OH)$_2$ electrode is already incorporated into an electrochemical cell.

11. The method according to claim 9 wherein said electrode has not yet been incorporated into an electrochemical cell and wherein said method further comprises a step of incorporating the electrode into an electrochemical cell after the step of repeating said charging and discharging steps.

12. The method according to claim 11 wherein said step of incorporating the electrode into an electrochemical cell comprises the substeps of:
   providing a cell housing, an electrolyte, a separator, and a negative electrode;
   inserting said positive electrode into the cell housing along with the electrolyte and along with, and separated by the separator from, said negative electrode; and
   sealing the cell housing.

13. The method according to claim 1 wherein said Ni(OH)$_2$ electrode comprises Ni(OH)$_2$ and at least one additive.

14. The method according to claim 13 wherein said at least one additive is selected from the group consisting of cadmium, calcium, cobalt, copper, bismuth, indium, magnesium, manganese, vanadium, yttrium, and zinc metals and compounds, non-Ni(OH)$_2$ nickel compounds, and mixtures thereof.

15. The method according to claim 14 wherein said additive is selected from the group consisting of cadmium, manganese, and zinc metals and compounds, and mixtures thereof.

16. The electrode made according to the method of claim 1.

17. The electrode according to claim 16 wherein at least about 5% of said Ni(OH)$_2$ has been converted to γ-NiOOH.

18. The electrode according to claim 17 wherein at least about 50% of said Ni(OH)$_2$ has been converted to γ-NiOOH.

19. The electrode according to claim 18 wherein at least about 95% of said Ni(OH)$_2$ has been converted to γ-NiOOH.

20. The electrode according to claim 19 wherein about 100% of said Ni(OH)$_2$ has been converted to γ-NiOOH.

21. The electrode made according to the method of claim 5.

22. The electrode made according to the method of claim 6.

23. The electrode made according to the method of claim 7.

24. The electrode made according to the method of claim 9.

25. The electrode made according to the method of claim 10.

26. The electrode made according to the method of claim 11.

27. The cell made according to the method of claim 6.

28. The cell made according to the method of claim 7.

29. The cell made according to the method of claim 10.

30. The cell made according to the method of claim 11.

31. A method of producing a positive electrode which will, upon charging, contain stably cyclable γ-NiOOH, comprising the steps of:

providing a Ni(OH)$_2$ electrode, charging said electrode to at least about 100% of its single-electron capacity at a rate of about C to about C/5, and overcharging said electrode to at least about 125% of its single electron capacity at a rate of about C/5 to about C/10.

32. The method according to claim 31 wherein said charging and overcharging steps are repeated in order, as a cycle, at least one more time for a total of at least two complete cycles.

33. The method according to claim 31 wherein said step of charging comprises charging the positive electrode to about 100% of its single-electron capacity at a rate of about ⅕ of C, and said step of overcharging comprises charging the positive electrode to at least about 150% of its single electron capacity at a rate of about ¹⁄₁₀ of C.

34. The method according to claim 31 wherein said overcharging step comprises charging said electrode to at least about 200% of its single electron capacity.

35. The method according to claim 34 wherein said overcharging step comprises charging said electrode to at least about 300% of its single electron capacity.

36. The method according to claim 31 wherein said method further comprises a pre-charging step comprising charging said electrode at a rate of about ¹⁄₂₀ of C to about ¹⁄₁₀₀ of C for at least about 2 hours before said charging step.

37. The method according to claim 36 wherein said precharging step is performed for a sufficient time to charge said electrode to about full, single electron capacity.

38. The method according to claim 36 wherein said pre-charging step comprises charging said electrode at a rate of about ¹⁄₅₀ of C for at least about 5 hours before said charging step.

39. The method according to claim 36 wherein said precharging, charging, and overcharging steps are repeated in order, as a cycle, at least one more time for a total of at least two complete cycles.

40. The method according to claim 31 wherein said step of providing a Ni(OH)$_2$ electrode comprises providing a sintered Ni(OH)$_2$ electrode.

41. The method according to claim 40 wherein said sintered Ni(OH)$_2$ electrode is already incorporated into an electrochemical cell.

42. The method according to claim 40 wherein said electrode has not yet been incorporated into an electrochemical cell and wherein said method further comprises a step of incorporating the electrode into an electrochemical cell after the step of overcharging the electrode.

43. The method according to claim 42 wherein said step of incorporating the electrode into an electrochemical cell comprises the substeps of:

providing a cell housing, an electrolyte, a separator, and a negative electrode;

inserting said positive electrode into the cell housing along with the electrolyte and along with, and separated by the separator from, said negative electrode; and sealing the cell housing.

44. The method according to claim 31 wherein said step of providing a Ni(OH)$_2$ electrode comprises providing a foam Ni(OH)$_2$ electrode.

45. The method according to claim 44 wherein said foam Ni(OH)$_2$ electrode is already incorporated into an electrochemical cell.

46. The method according to claim 44 wherein said electrode has not yet been incorporated into an electrochemical cell and wherein said method further comprises a step of incorporating the electrode into an electrochemical cell after the step of overcharging the electrode.

47. The method according to claim 46 wherein said step of incorporating the electrode into an electrochemical cell comprises the substeps of:

providing a cell housing, an electrolyte, a separator, and a negative electrode;

inserting said positive electrode into the cell housing along with the electrolyte and along with, and separated by the separator from, said negative electrode; and sealing the cell housing.

48. The electrode made according to the method of claim 31.

49. The electrode according to claim 48 wherein at least about 5% of said Ni(OH)$_2$ is converted to γ-NiOOH.

50. The electrode made according to the method of claim 32.

51. The electrode according to claim 50 wherein at least about 5% of said Ni(OH)$_2$ is converted to γ-NiOOH.

52. The electrode according to claim 51 wherein at least about 50% of said Ni(OH)$_2$ is converted to γ-NiOOH.

53. The electrode according to claim 52 wherein at least about 95% of said Ni(OH)$_2$ is converted to γ-NiOOH.

54. The electrode according to claim 53 wherein about 100% of said Ni(OH)$_2$ is converted to γ-NiOOH.

55. The electrode made according to the method of claim 39.

56. The electrode according to claim 55 wherein at least about 5% of said Ni(OH)$_2$ is converted to γ-NiOOH.

57. The electrode according to claim 56 wherein at least about 50% of said Ni(OH)$_2$ is converted to γ-NiOOH.

58. The electrode according to claim 57 wherein at least about 95% of said Ni(OH)$_2$ is converted to γ-NiOOH.

59. The electrode according to claim 58 wherein about 100% of said Ni(OH)$_2$ is converted to γ-NiOOH.

60. The electrode made according to the method of claim 40.

61. The electrode made according to the method of claim 41.

62. The electrode made according to the method of claim 42.

63. The electrode made according to the method of claim 44.

64. The electrode made according to the method of claim 45.

65. The electrode made according to the method of claim 46.

66. The cell made according to the method of claim 41.

67. The cell made according to the method of claim 42.

68. The cell made according to the method of claim 45.

69. The cell made according to the method of claim 46.

70. The method according to claim 31 wherein said $Ni(OH)_2$ electrode comprises $Ni(OH)_2$ and at least one additive.

71. The method according to claim 70 wherein said at least one additive is selected from the group consisting of cadmium, calcium, cobalt, copper, bismuth, indium, magnesium, manganese, vanadium, yttrium, and zinc metals and compounds, non-$Ni(OH)_2$ nickel compounds, and mixtures thereof.

72. The method according to claim 71 wherein said additive is selected from the group consisting of cadmium, manganese, and zinc metals and compounds, and mixtures thereof.

73. The method according to claim 36 wherein said electrode comprises at least one cobalt-based additive.

74. The method according to claim 73 wherein said at least one cobalt-based additive is selected from the group consisting of $CoO$, $Co(OH)_2$, $Co(OH)_3$, $CoOOH$, $CoO_2$, $(CoO_2)^-$, $(CoO_2)_2^-$, $(CoO_2)_3^-$, elemental cobalt, and cobalt alloys.

75. The method according to claim 74 wherein said cobalt-based additive originates as at least one cobalt source, added to the $Ni(OH)_2$, which is selected from the group consisting of elemental cobalt, cobalt alloys, cobalt salts, and other cobalt compounds.

76. The method according to claim 74 wherein said cobalt-based additive originates as a coprecipitant with $Ni(OH)_2$.

* * * * *